United States Patent
Hottinen et al.

[11] Patent Number: 5,845,208
[45] Date of Patent: Dec. 1, 1998

[54] METHOD FOR ESTIMATING RECEIVED POWER AND A RECEIVER

[75] Inventors: Ari Hottinen, Vantaa; Ilkka Keskitalo, Oulu; Arto Kiema, Salo; Petri Jolma, Oulu; Ingo Kühn, Oulu; Jari Savusalo, Oulu; Risto Uola, Oulu, all of Finland; Anne Siira, Farnborough, United Kingdom; Ari Kärkkäinen, Varkaus, Finland

[73] Assignee: Nokia Telecommunications Oy, Espoo, Finland

[21] Appl. No.: 549,804

[22] PCT Filed: Mar. 16, 1995

[86] PCT No.: PCT/FI95/00141

§ 371 Date: Apr. 8, 1996

§ 102(e) Date: Apr. 8, 1996

[87] PCT Pub. No.: WO95/25365

PCT Pub. Date: Sep. 21, 1995

[30] Foreign Application Priority Data

Mar. 17, 1994 [FI] Finland ................................. 941268

[51] Int. Cl.⁶ ....................................................... H04Q 7/22
[52] U.S. Cl. .................... 455/422; 455/437; 455/438; 455/522; 455/525; 455/67.1; 455/226.1
[58] Field of Search .................... 455/422, 424, 455/425, 436, 437–438, 443, 444, 509, 513, 517, 522, 524, 525, 550, 561, 562, 575, 67.1, 226.1, 226.2, 226.3; 375/232

[56] References Cited

U.S. PATENT DOCUMENTS

| 4,608,711 | 8/1986 | Goldman ................................. 455/436 |
| 5,129,098 | 7/1992 | McGirr et al. ..................... 455/67.1 X |
| 5,241,690 | 8/1993 | Larsson et al. .......................... 455/522 |
| 5,379,446 | 1/1995 | Murase .................................... 455/444 |
| 5,475,710 | 12/1995 | Ishizu et al. ............................ 375/232 |
| 5,542,111 | 7/1996 | Ivanov et al. ............................ 455/522 |

FOREIGN PATENT DOCUMENTS

| 0455614 | 6/1991 | European Pat. Off. . |
| 0 455 614 | 11/1991 | European Pat. Off. .......... H04B 7/25 |
| 0 462 952 | 12/1991 | European Pat. Off. ........ H04B 7/005 |
| 91/17608 | 11/1991 | WIPO .............................. H04B 7/26 |
| 94/28661 | 12/1994 | WIPO ............................ H04L 25/03 |

OTHER PUBLICATIONS

Shumway, Robert, *Applied Statistical Time Series Analysis*, Prentice Hall, 1988, pp. 175–201.

Strobach, P. *Linear Prediction Theory*, Springer Verlad, 1990, pp. 312–335.

*Primary Examiner*—Reinhard J. Eisenzopf
*Assistant Examiner*—Philip J. Sobutka
*Attorney, Agent, or Firm*—IP Group of Pillsbury Madison & Sutro LLP

[57] ABSTRACT

A receiver, and a method for estimating received power in a cellular radio system having in each cell at least one base station communicating with mobile stations within its coverage area. The mobile stations measure strength of the signal received from a base station, and report the measurement results to that base station. To improve power adjustment, a model describing the dynamic behavior of the signal is created for the received power on each connection. The model is utilized for power adjustment, as well as for making handover decisions.

13 Claims, 2 Drawing Sheets

METHOD FOR ESTIMATING RECEIVED POWER AND A RECEIVER

BACKGROUND OF THE INVENTION

The invention relates to a method for estimating received power in a cellular radio system comprising in each cell at least one base station communicating with mobile stations within its coverage area, in which system mobile stations measure strength of the signal received from a base station, and report the measurement results to the respective base station equipment, and each the base station measures strength of the signals received from the respective mobile stations.

It is typical of a cellular radio environment that conditions for radio wave propagation change constantly. This is due to changes in the location of mobile stations with respect to the base station, as well as changes in the environment of mobile stations. In the connection between a mobile station and a base station, the attenuation to which radio waves are subjected on the radio path thus varies constantly. Consequently, especially the transmission power used by the mobile station must be monitored continuously, and adjusted at each moment of time. Generally, the aim is to minimize the transmission power used by the mobile station, so that both power consumption of the station and interference caused by the station to other connections will be minimal. Power adjustment is particularly critical in CDMA systems, in which the aim is that each base station receive the transmission of the mobile stations within its coverage area by using the same power level when possible.

As attenuation on the radio path between a base station and each respective mobile station varies, there must constantly be a possibility to hand over the communication to another base station as rapidly as possible, before the connection to the old base station is broken.

The speed and accuracy of both power adjustment and handover depend on the quality control of the connection between the respective mobile station and the respective base station. In practice, this has been carried out in such a way that both the respective base station and the respective mobile station measure the power level of the received signal. The mobile station reports the measurement results to the base station, which transmits power adjustment commands to the mobile station, and, as the signal weakens, makes the handover decision.

The power level of the received signal is a continuously changing variable, and instantaneous measurement results contain some inaccuracy, such as measurement noise and time-dependent error caused by the actual measurement devices. Therefore, the measurement results are not useful as such, but they must be processed in some way to minimize the effect of measurement errors.

In prior art systems, measurement results of received power are filtered, i.e. averaged, within a time window of a certain size. When this procedure is applied, the worst error peaks can be eliminated from the measurement results. The prior art method has the advantage of being simple to implement, but it has the drawback of being unadaptable to the behavior of rapidly changing data. A way to improve the prior art method is to adjust the width of the time window, but this approach is also unable to model a changing signal sufficiently well, and thus is not useful in predicting the future behavior of the signal.

SUMMARY OF THE INVENTION

It is thus an object of the present invention to utilize the measurement results better than heretofore, by using statistical methods in processing the measurement results. In particular, these methods allow considerably better prediction of the behavior of the signal power level than heretofore, thus allowing remarkably more rapid reactions to changes in the quality of the connection. Therefore, power adjustment may be carried out more accurately than heretofore, and abrupt handover situations may be responded to more rapidly. In addition to prediction, the methods enable more accurate estimates of the reliability of the measurement results, as well as estimates of possibly missing measurement values.

This is achieved with a method of the type set forth in the foregoing BACKGROUND section, which is characterized in that with the aid of received measurement results, a model describing the dynamic behavior of the signal, is created for the received power on each connection, and that when the model is formed, at least one signal interfering with the connection is taken into account, and that the model is utilized for power adjustment as well as for making handover decisions.

The invention also relates to a receiver, for use in a cellular radio system comprising in each cell at least one base station communicating with mobile stations within its coverage area, in which system mobile stations measure strength of the signal received from a respective base station, and report the measurement values to the respective base station equipment, and in which the respective base station measures strength of the signal received from mobile stations, the equipment comprising means for recording measurement results obtained from mobile stations. The receiver is characterized by comprising means for forming with the aid of the received measurement results, a model describing the dynamic behavior of the signal for the received power on each connection, taking into account at least one signal interfering with the connection, and means for utilizing the predicted data for power adjustment, as well as for making handover decisions.

The solution in accordance with the present invention enables improvement of power adjustment especially in a microcell environment in street corner situations. In such a case, a mobile station approaching from an intersecting street must rapidly adjust its signal strength in accordance with instructions from a new base station. Rapid power adjustment enabled by the invention may significantly improve the operation of power adjustment in a situation of this kind.

BRIEF DESCRIPTION OF THE DRAWINGS

In the following, the invention will be described in greater detail with reference to the examples in accordance with the accompanying drawings, in which.

DETAILED DESCRIPTION

In the method of the invention, statistical methods are thus employed for processing the measurement results of a radio channel. Thus, it is possible to draw more conclusions on the future changes of the quality of the radio channel from the measurement results than heretofore, in which case it is also possible to estimate missing measurement values.

A model describing dynamic behavior of the signal is formed from the measurement results of the received signal. In the following, processing of the measurement results is illustrated with Kalman filtering, but other statistical methods may also be used for processing the measurement results in the method of the invention. Kalman filtering is an optimal time-domain prediction method for linear models. The accuracy of linear models is sufficient for short-term predictions. A so-called state space model is formed in connection with Kalman filtering on the basis of the measurement results. The equations of the state space model may be expressed as the observation equation (1):

$$y_t = A_t x_t + v_t \quad (1)$$

in which y represents an observation vector, A is a matrix determining how an unobserved state vector x can be converted to an observation vector y, and v represents an observation noise vector. State transitions are denoted by the equation $$X_t = Bx_{t-1} + w_t, \quad (2)$$

in which B is a transition matrix and w a noise vector. In both equations t=1,2, . . . , T. Noise vectors v and w can be assumed to be mutually independent, and their default values can be set to zero.

Let us suppose that signal behavior can be modelled autoregressively in accordance with the equation:

$$x_t = a_1 x_{t-1} + a_2 x_{t-2} + w_t \quad (3)$$

$$y_t = x_t + v_t,$$

which can also be expressed as $$(x_t \, x_{t-1})^T = \begin{pmatrix} a_1 & a_2 \\ 1 & 0 \end{pmatrix} (x_{t-1} \, x_{t-2})^T + (w_t \, 0)^T \quad (4)$$

$$y_t = (1 \, 0)(x_t \, x_{t-1})^T + v_t,$$

in which the matrices occuring in the general formulas can be more easily identified.

In the following, the method of the invention will be set out in connection with a base station; however, the invention is not limited to it. The method can naturally also be applied in the receiver of a mobile station.

Figure 1:
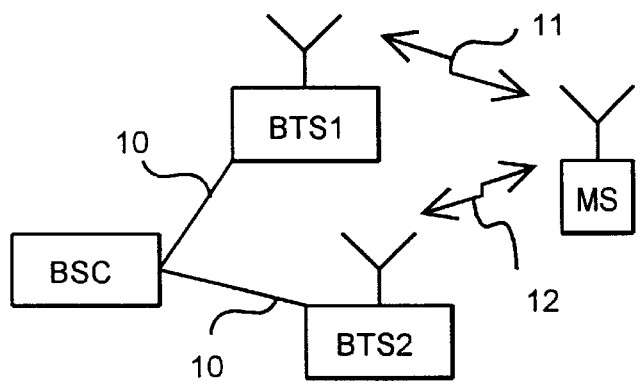
FIG. 1 shows a part of a cellular radio system, in which the method of the invention can be applied.

FIG. 1 thus illustrates a cellular network system, in which the method of the invention can be applied. The figure shows two base stations, BTS1 and BTS2, each base station serving its own coverage area. The base stations are connected to a base station controller BSC via digital transmission links 10. In a situation shown in FIG. 1, a mobile station MS is located in the area between two base stations, in which the mobile station is able to receive signals 11, 12 from both base stations.

The mobile station measures the strength of the signal received from a respective base station, and reports the measurement results to that base station. Let the measurement results transmitted by the mobile station be denoted by y(t), in which t=1, 2, . . . T. The respective base station controller analyses the measurement results from the mobile station. Kalman filter estimators now have the form $$x(t|t-1) = Bx(t-1|t-1) \quad (5)$$

$$x(t|t) = x(t|t-1) + K(t)[y(t) - A(t)x(t|t-1)],$$

in which the transition matrix B is determined in each cell on the basis of the dynamic process of the channel. Cells of various kinds can be modelled by using the above described matrix. The matrix can model, e.g., exponential fading of the signal as a function of distance. The dimension of the matrix determines the order of the state space model. In the above example (formulas 3 and 4), the order is two. In practice, the model can be determined by examining the measurement results. Known link parameters, such as Doppler spread can be utilized in the selection of the model. When Doppler spread is small, it is known that the mobile station is moving slowly, which is often the case in an urban area, and the dimension of the matrix can thus be selected to be small. The gain matrix K(t) can be calculated recursively based on a prediction error covariance matrix.

The one step prediction x(t|t−1) has been calculated directly on the basis of the previous predicted value, whereas the best estimator x(t|t), involving the current data value is a weighted average of the one step prediction x(t|t−1) and of the error that occurs in predicting y(t).

The base station is capable of optimal adjustment of the transmission power of the mobile station by estimating measured values. The invention can be applied specifically in a CDMA cellular radio network, in which the base station must, in order to maximize the capacity of the cell, adjust the transmission power of mobile stations so that it receives all stations with the same signal strength. In this case, the accurate and rapid power adjustment enabled by the method of the invention is particularly advantageous.

The invention can also be advantageously applied in cellular radio systems in which interference within the same channel occurs. For instance, if frequency re-use in TDMA systems is increased in order to achieve a higher frequency efficiency, interference within the same frequency channel may occur.

Figure 2:
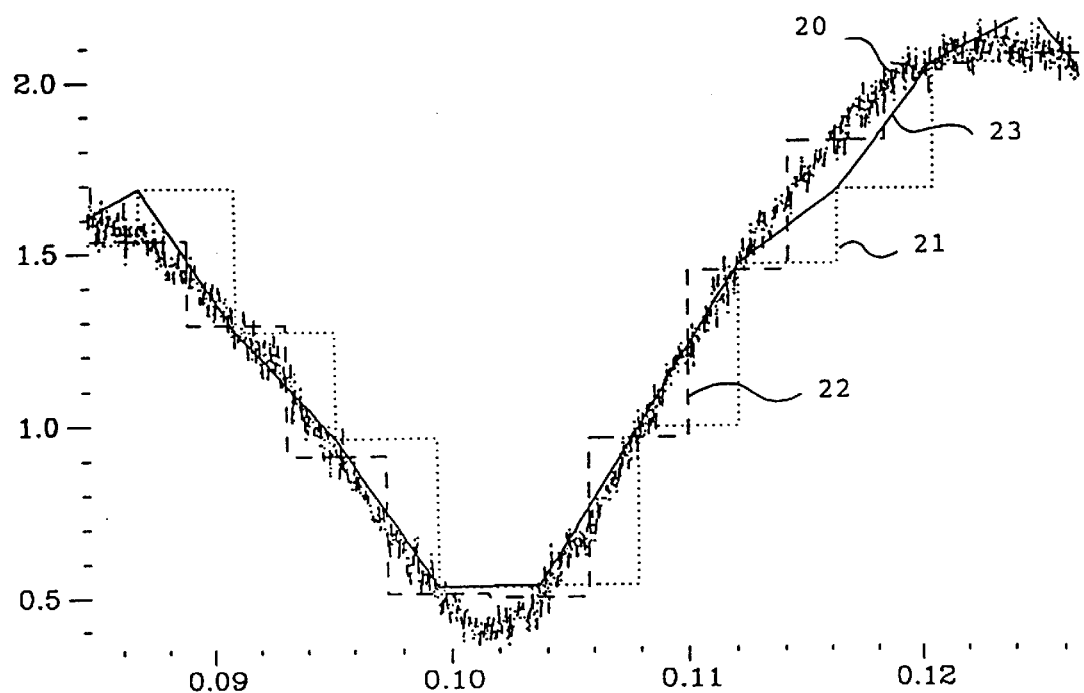
FIG. 2 illustrates operation of the method of the invention in a power adjustment situation compared with prior art methods.

FIG. 2 illustrates the accuracy of power adjustment based on estimates calculated from the measurement results, compared with prior art methods. In FIG. 2, the horizontal axis represents time and the vertical axis represents power value. In the figure, a value 21 obtained with a conventional non-predictive method, as well as signal estimates 22 and 23 obtained with two different estimation methods have been drawn on the actual signal 20. As can be noticed, the predictive one-step estimate 22 provides a more accurate value of the signal than the non-predictive method 21. An even more accurate estimate of the signal can be obtained with the linear estimate 23. The situation shown in FIG. 2 has been simulated by using the frequency of 1.8 GHz in a 2-path Rayleigh channel; the velocity of the mobile station is assumed to be 25 km/h, and power adjustment is carried out at intervals of 2 ms.

The invention may also be applied in the case of handover in the boundary area between the coverage areas of two base stations. On the basis of the estimates calculated from measurement results transmitted by the mobile station MS, the base station controller BSC can estimate an optimal point of time for handover in a situation as shown in FIG. 1. By using the method of the invention, the base station controller can predict the signal behavior in a fading channel, and initiate handover procedures more rapidly compared with prior art methods.

Figure 3:
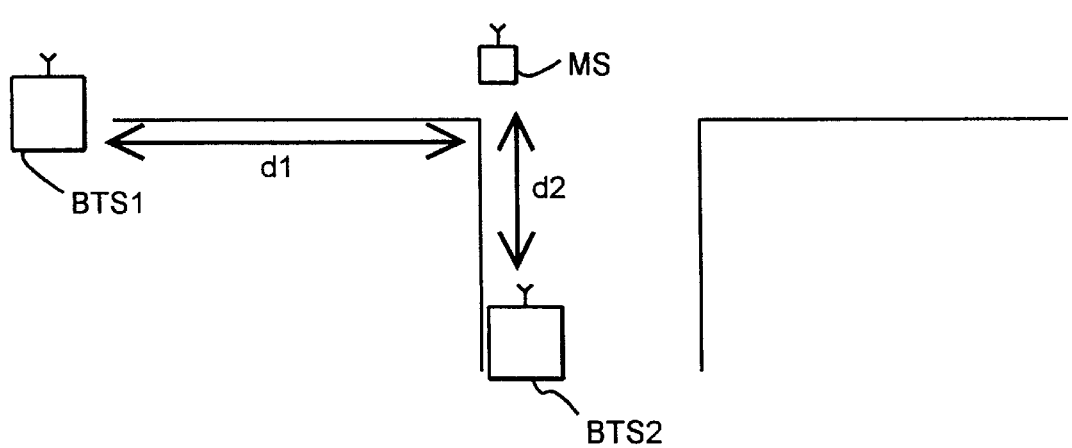
FIG. 3 illustrates a street corner situation, in which rapid power adjustment is needed.

In street corner situations, in which the signal propagation environment may change extremely rapidly, rapid power adjustment is necessary. In the method of the invention, the base station can adjust transmission power very rapidly on the basis of the measurement results. FIG. 3 illustrates a situation in which a mobile station which is communicating with a base station BTS1 comes to a street corner, and to the coverage area of a base station BTS2. Let us assume that the distance d1 of the base station BTS1 from the street corner is longer than that d2 of the base station BTS2. Let us further assume a system in which both base stations transmit by using the same frequency band, which is the case, e.g. in a cellular radio system applying the CDMA-multiple access method.

The mobile station, controlled by base station BTS1, transmits by using a high transmit power. As the mobile station comes to a street corner, its transmission interferes with base station BTS2 with its high transmission power. The mobile station must therefore rapidly reduce its transmission power and change over to the coverage area of BTS2. In a case of this kind, the predictive method of the invention can be employed in such a way that when approaching the street corner, the mobile station notices that the transmission power of base station BTS2 gradually increases. As the signal of BTS2 is estimated, its behavior can be predicted, and the necessary handover can thus be initiated rapidly as soon as it becomes possible. Thus, interference caused to other connections in the cell is smaller compared with prior art methods.

The method can also be used for estimating missing measurement values of the mobile station. Measurement results may be destroyed, e.g. due to interference on the radio path when the results are transmitted to a base station. Missing measurement values can be estimated with recursive calculations by using equations of the type described above.

Furthermore, the method can be employed for estimating reliability of the measurement results received from a mobile station. If a measurement result received from a mobile station notably deviates from the estimated value, it can be assumed that an error has occurred in data transmission, and that the transmitted measurement result perhaps is not correct.

Thus, in the method of the invention, a model suitable for the cell is first selected. In the selection, previously measured power values are used as the basis for the selection of the matrices B and A for the above shown formulas (b 1), (2) and (5). Once the suitable model has been selected, estimate algorithms may be calculated either forwards or recursively, depending on whether a signal to be received is predicted, or whether missing measurement values are estimated. Estimates obtained in this way can further be processed as true power values in handover or power adjustment algorithms. Kalman filtering and calculations pertaining to it are described in greater detail in Robert Schumway: Applied statistical time series analysis, Prentice Hall, 1988, and P. Strobach: Linear Prediction Theory, Springer Verlag 1990, which are incorporated herein by reference.

In accordance with a preferred embodiment of the invention, when the model describing dynamic behavior of the signal is formed, one or more interfering signals are also taken into account besides the actual signal. In such a case, it is possible to take possible correlations between signals into account. E.g. in CDMA systems, spreading codes used for various connections are not fully independent, and thus correlation occurs between connections.

Figure 4:
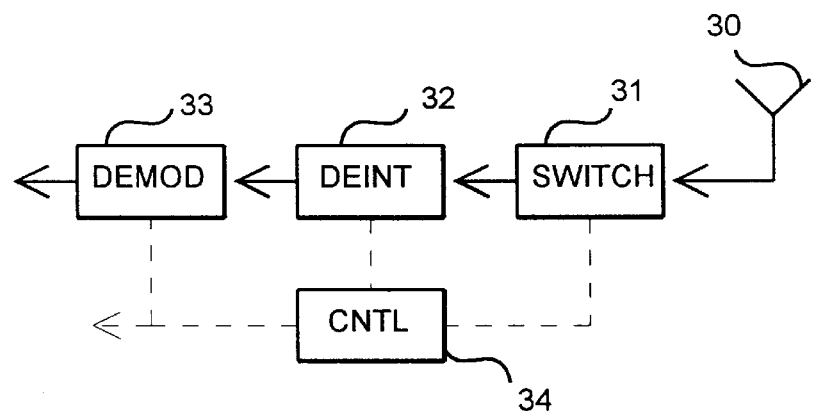
FIG. 4 illustrates the structure of a receiver of the invention.

FIG. 4 is a block diagram illustrating the structure of a receiver in which the method of the invention is applied. The receiver comprises an antenna 30, means 31 for switching the signal to the baseband, means 32 for deinterleaving the signal, and means 33 for demodulating the signal. The receiver further comprises means 34 for controlling the operation of other blocks and the receiver. The receiver, as will be understood, also comprises other components, such as converters and filters, and depending on the nature of the receiver, also a speech decoder, but, since these components are not essential to the present invention, they are not shown in this illustration.

The receiver in which the method of the invention is applied comprises means 34 for estimating the received signal on the basis of the measurement results obtained by the mobile station and the base station. Means 34 can be implemented, e.g. by means of a digital signal processor.

Although the invention has been described above with reference to the examples shown in the accompanying drawings, it is obvious that the invention is not restricted to these examples, but can be modified in a variety of ways within the scope of the inventive concept recited in the attached claims.

We claim:

1. A method for estimating received power in a cellular radio system which has in each cell at least one base station communicating with mobile stations within its respective coverage area, in which system mobile stations measure strength of the signal received from a respective base station, and report the measurement results to equipment of the respective base station, and the respective base station measures strength of the signals received from the respective mobile stations, comprising:

creating with the aid of the received measurement results, a space state model describing the dynamic behavior of the respective signals for received power on each connection, as said model is being created, taking into account at least one signal interfering with the connection, calculating an estimate of received power for each respective mobile station on the basis of said model, each respective said estimate taking said at least one interfering signal into account and therefore being nonlinear, and utilizing said each said estimate both for making power adjustments and for making handover decisions.

2. The method as claimed in claim 1, comprising:

at each given time t, predicting the power received by each respective mobile station at a following moment of time t+$\Delta$T on the basis of said model.

3. The method as claimed in claim 1 comprising:

constantly updating a state space model for each connection in accordance with the measurement of received power carried out the each respective mobile station.

4. The method as claimed in claim 1 wherein:

in case of a missing result of a measurement carried out by a respective said mobile station at a given moment of time, calculating an estimate for said missing result on the basis of said state space model.

5. The method as claimed in claim 1 comprising:

at each given time t, calculating the correctness of the measurement carried out by each respective mobile station by comparing a respective measurement result with a respective estimate calculated on the basis of said model.

6. The method as claimed in claim 5, wherein:

each respective mobile station carries out measurement for the received power at time intervals of $\Delta$T.

7. The method as claimed in claim 5, wherein:

in calculating an estimate for the measurement results received from each respective mobile station at each given time t, applying the Kalman filtering algorithm.

8. The method as claimed in claim 5, wherein:

when calculating a prediction for the power received by each respective mobile station at a respective following moment of time, applying the Kalman filtering algorithm.

9. A receiver, for use in a cellular radio system having in each cell at least one base station communicating with mobile stations within its respective coverage area, in which system mobile stations measure the strength of the signal received from a respective base station, and report the measurement results to equipment of the respective base station, and the base stations measure the strength of the signals received from the respective mobile stations, the base station equipment having means for recording the measurement results reported to the respective base station said receiver comprising:

model forming means for forming with the aid of the received measurement results, a model describing the dynamic behavior of the respective signal for the received power on each connection, taking into account at least one signal interfering with the connection, and for calculating an estimate of received power for each respective connection on the basis of said model, each respective said estimate taking said at least one interfering signal into account and therefore being non-linear, and means for utilizing each said estimate for power adjustment, as well as for making handover decisions.

10. The receiver as claimed in claim 9, comprising:

means for predicting at each given time t, the received power from each respective said connection at a following moment of time $t+\Delta T$ on the basis of the state space model.

11. The receiver as claimed in claim 9 comprising:

means for calculating the correctness of the measurement carried out by each respective mobile station at each given time t by comparing the result with a respective estimate calculated on the basis of the state space model.

12. The receiver as claimed in claim 11, functionally incorporated in a mobile station.

13. The receiver as claimed in claim 11, functionally incorporated in a mobile station.

* * * * *